(No Model.)

E. HAMBUJER.
FURNITURE CASTER.

No. 365,809. Patented July 5, 1887.

Attest:
John Schuman.
Edmond T. Scully.

Inventor:
Ephraim Hambujer.
by his Atty
Charles J. French

UNITED STATES PATENT OFFICE.

EPHRAIM HAMBUJER, OF DETROIT, MICHIGAN, ASSIGNOR OF THREE-FOURTHS TO S. WIGHTMAN STEWART AND HENRY WÜNSCH, BOTH OF SAME PLACE.

FURNITURE-CASTER.

SPECIFICATION forming part of Letters Patent No. 365,809, dated July 5, 1887.

Application filed May 9, 1887. Serial No. 237,570. (No model.)

*To all whom it may concern:*

Be it known that I, EPHRAIM HAMBUJER, of Detroit, in the county of Wayne and State of Michigan, have invented new and useful Improvements in Furniture-Casters; and I do hereby declare that the following is a full, clear, and exact description thereof, reference being had to the accompanying drawings, which form a part of this specification.

This invention relates to new and useful improvements in furniture-casters, and belongs to that class known as "ball-casters."

The invention consists in the construction and arrangement of the different parts, all as more fully hereinafter described, and shown in the accompanying drawings, in which—

Figure 1:
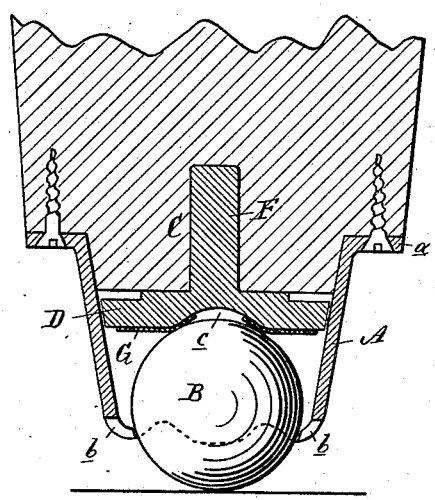
Figure 2:
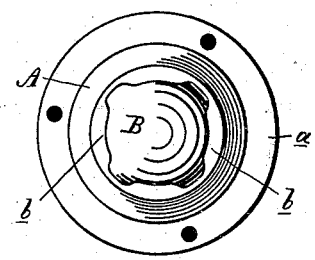
Figure 3:
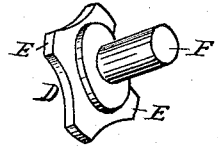

Figure 1 is a vertical central section showing the caster attached to a furniture-leg. Fig. 2 is a bottom view, and Fig. 3 is a detached perspective of the upper bearing of the ball.

A is a conical shell, provided at its upper end with an annular flange, $a$, by means of which and suitable screws the caster is secured in the ordinary manner. The lower conical end of the shell is cut away at several points to form three or more downwardly-projecting lips, $b$, which are preferably also bent inwardly to form side bearings for the ball B, which projects through the lower end of the cup, but cannot pass through.

C is an upper bearing, formed of a disk, D, fitting within the conical shell, and having formed upon its under side, and in the center thereof, the concave recesses $c$, of less diameter than the ball, so as to form the annular bearing for the ball upon the edges of the concavity. The disk D is supported upon the inner walls of the conical shell A, and may be cut away upon its periphery, as shown, to form sectional bearing-surfaces E against the wall of the cylindrical shell, and between its annular bearing C and the side bearings of the ball the latter is allowed a slight vertical play. Upon its upper face the disk D is provided with an upwardly-projecting stem, F, which is intended to fit into a hole bored in the furniture-leg, and supported therein independently of the conical shell.

G is a washer of thin mica interposed between the upper bearing, C, and the top of the ball, and forms an anti-friction bearing for the ball, which permits it to rotate more freely than without it.

Instead of securing the caster by means of a flange, $a$, the leg may be simply inserted into the upper end of the conical cup and suitably fastened therein.

What I claim as my invention is—

In a furniture-caster, the combination, with the ball B, of the conical shell A, provided with the downwardly and inwardly projecting lips $b$, arranged to form side bearings for the ball, the disk C, supported upon the inner side of the conical shell and concaved upon its under side to form an annular top bearing for the ball, and the mica washer G, interposed between the ball and the top bearing of the ball, all substantially as and for the purposes set forth.

E HAMBUJER.

Witnesses:
E. H. BOND,
CHAS. H. RAEDER.